Nov. 12, 1957 K. SCHÜTZ 2,812,613
DEVICE FOR DISTRIBUTING ACTIVE SUBSTANCES
FOR PORTABLE MACHINES FOR THE
DESTRUCTION OF PARASITES
Filed Jan. 31, 1956 2 Sheets-Sheet 1

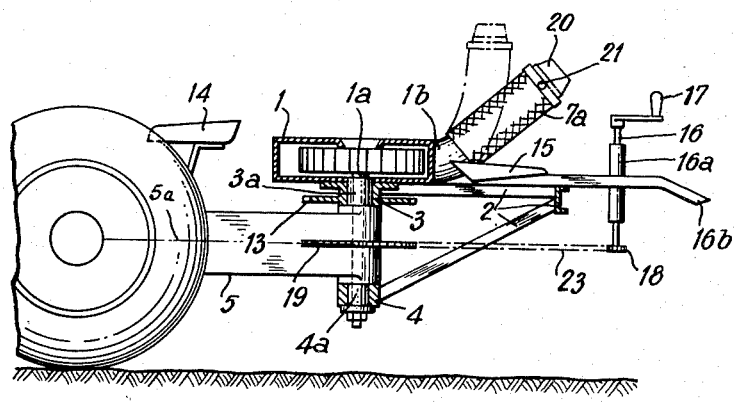
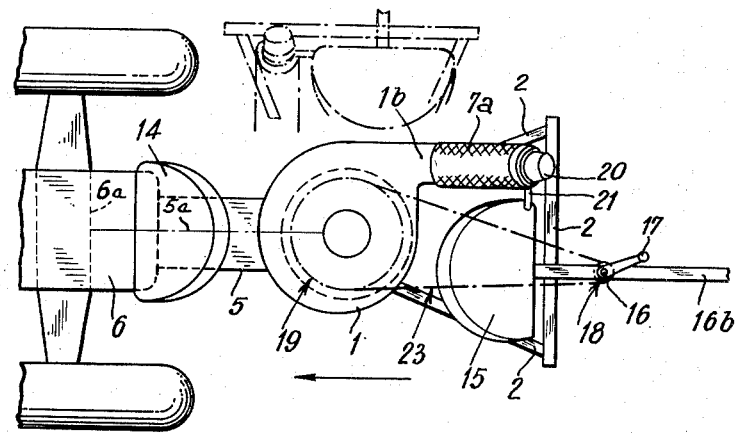

United States Patent Office 2,812,613
Patented Nov. 12, 1957

2,812,613
DEVICE FOR DISTRIBUTING ACTIVE SUBSTANCES FOR PORTABLE MACHINES FOR THE DESTRUCTION OF PARASITES

Kurt Schütz, Peine, Germany

Application January 31, 1956, Serial No. 562,548

Claims priority, application Germany February 10, 1955

5 Claims. (Cl. 43—148)

This invention relates to the destruction of parasites, and more particularly to portable machines which perform this function.

There exist portable machines for the destruction of parasites, in which the active substances are blown in the form of dust or of drops of liquid into a crop by a stream of air produced by a blower. When treating crops of considerable height, such as trees or the like, which hereinafter will be called "tall growths," the active substances are blown through a mobile nozzle. The mobility of the nozzle which is necessary in order that it may be trained in the required direction is either obtained by means of a flexible connection, or else by mounting the blower itself so that it can be swung around its horizontally arranged axis. It is also known to mount an entire machine group, including the driving motor, so that it can be swung around a vertical axis. On the other hand when field or ground crops are to be treated, the distributing device once set in position remains in this position during the whole of the treatment. In this case use is made of a distributing tube some 8 to 10 meters in length, which also ejects and distributes the active substances by means of compressed air. The design of such a distributing tube is known. If it is necessary to be able to carry out selectively the two kinds of treatment of cultures mentioned with one and the same machine, then it must be possible to connect two totally different and easily interchangeable distributing devices to the blower, each of which should have its individual and appropriate mobility in operation. The training range of the stream discharged by the mobile nozzle should be practically hemispherical, while the lengthly fixed distributing tube should in operation remain in a position transverse to the direction of motion of the machine in which it was initially set and must be arranged so that it can be placed quickly in longitudinal relation to the vehicle, for road travel. The solution of this double problem, which the invention proposes, is rendered difficult by the fact that large quantities of air must be delivered per minute, requiring the use of pipes which although having a large section should still be of the shortest possible length. A further difficulty arises from the practical requirement that when ground crops are being treated the machine should be operated and driven by the same person for reasons of economy, while when tall growths, such as, for instance, trees or similar plants are being treated with the mobile nozzle, two attendants are absolutely necessary, one of whom acts as a driver and the other trains the nozzle, and therefore always must have the object to be treated before his eyes, whether it be to the right or to the left of the machine. The last named attendant must therefore be able to change his own position with respect to that of the nozzle easily.

In order to fulfill the task set, the invention contemplates a device for portable machines for the destruction of parasites, which distributes active substances in the form of dust or of fine drops of liquid by means of an air blower. According to the invention the blower is arranged in the device with its axis vertical, the casing of the same is rigidly mounted on a supporting frame and this blower supporting frame assembly is mounted so as to be able to be swung manually horizontally around the vertical blower axis. In order that this swinging motion might be controlled either from a fixed point or from the swinging supporting frame, by means of a chain drive, the invention provides, in addition, the possibility of choosing between maintaining the driving sprocket of the chain drive at a fixed point of the frame of the machine and making it act through a chain on a chain wheel secured to the casing of the blower coaxially to the vertical axis of the latter in one case, and, in the other case, mounting the driving sprocket of the chain drive on the swinging supporting frame, while the corresponding chain wheel is also mounted coaxially to the vertical axis of the blower, but is rigidly fixed to the frame of the machine.

The device according to the invention is in particular destined for use with pulverizing and dust distributing machines fitted with a blower, which are designed to be either mounted on or drawn by a tractor and to be driven by the power shaft of the latter. The progress achieved by the invention becomes particularly clearly apparent in the case of this combination.

Further details of the invention will appear from the following description of embodiments of the invention, with reference to the drawings wherein:

Fig. 3 is a schematic view, shown partially in cross-section, of a further embodiment of the invention for the treatment of tall growths.

Fig. 4 is a top view of the embodiment according to Fig. 3, indicating two possible positions of the distributor of active substances.

Figure 1:
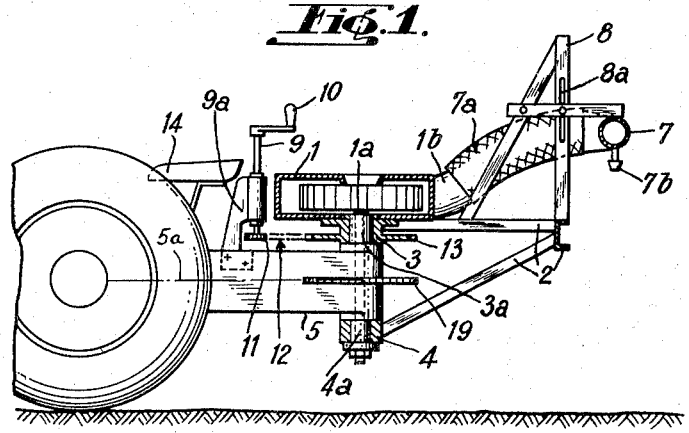
Fig. 1 is a schematic view, shown partially in cross-section of a first embodiment of the invention for the treatment of ground crops.

What the two embodiments of the device according to the invention schematically illustrated in the Figs. 1 and 4 have in common, is that they are both mounted on a machine frame 5 through a coupling 5a (which can be a chain or shaft indicated diagrammatically by the dash-dot line) which effects the connection with the power shaft or transmisison 6a of a tractor 6. The rear end of the machine frame 5 serves to carry a supporting frame 2 in a rotatable manner, this frame being built up from iron or steel tubes and forming a unit with the casing 1 of a centrifugal blower. The rotor of the centrifugal blower is driven by the power shaft of the tractor 6 through the machine frame 5. The blower casing 1 can be swung with its axis vertically arranged around pivot pins 3a, 4a of the machine frame 5. To this effect the unit formed by the blower casing and the supporting frame is provided with an upper and a lower bearing 3, respectively 4, by means of which the unit can be swung round the vertical axis of the blower in a horizontal direction in a horizontal plane. The rotary or swinging motion of the unit formed by the blower casing and the supporting frame is controlled by means of a chain drive 11, 12, 13, which is actuated by a hand operated crank 10.

According to whether it is desired to treat ground or field crops or tall growths, respectively, a flexible tube 7a is connected to the outlet 1b of the blower, which either leads to a distributing tube 7 fitted with nozzles 7b (Figs. 1 and 2), which can be adjusted to a determinable height above the ground and remains immovable in this position during the treatment of the crop, or is connected to a nozzle 20 (Figs. 3 and 4), which can be trained at will in the course of the treatment of the cultures.

For the treatment of ground crops, the distributing tube 7 is secured to the supporting frame 2 by means of a supporting structure 8, which is removably connected to the supporting frame 2 and on which the distributing tube 7 can be adjusted in height by means of a guiding slot 8a. The supporting structure 8 with the guiding slot 8a is only shown in Fig. 1 so as not to impair the clarity of Fig. 2. In its working position, the distributing tube 7 is arranged transversely to the direction, indicated by an arrow, in which the machine advances.

Figure 2:
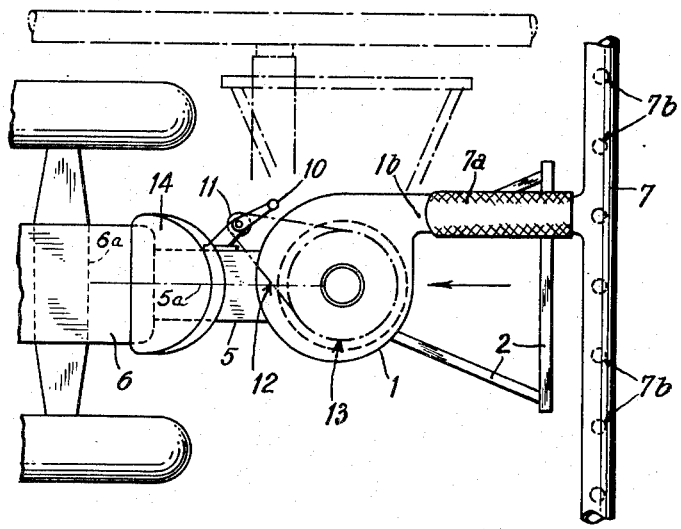
Fig. 2 is a top view of the embodiment according to Fig. 1, indicating two possible positions of the distributor of active substance.

If it should be required to swing the distributing tube 7 from this position, for instance to bring it to the transport position for running on roads shown by dots and dashes in Fig. 2, or else to be able to avoid obstacles in the shape of, for instance, trees or telegraph poles, then the unit formed by the blower and the supporting frame is swung round the pivot pins 3a, 4a in the following manner. A spindle bearing 9a is removably mounted on the machine frame 5 and carries a spindle 9, provided at one end with a hand operated crank 10 and at the other with a driving chain sprocket 11. A chain 12 runs from the sprocket 11 to a chain wheel 13, which is coaxial to the axis of the blower and is secured to the casing 1 of the latter and at the same time to the supporting frame 2. The spindle bearing 9a is mounted in the neighborhood of the driving seat 14, so that the driver is able to turn the handle 10 and thus swung round the distributing tube 7 horizontally to any desired position without having to leave his seat. The total swinging range of the tube 7 is equal to 180°, i. e. 90° to the right and 90° to the left. It is clear that this embodiment of the invention not only offers the advantage of easy operation, the driver himself being able to swing the distributing tube 7 round without requiring the help of an additional attendant, but also has the further advantage that the long distributing tube 7 need not be removed from the machine, for instance, for travelling on the road, after the treatment of the cultures is finished.

The embodiment according to Figs. 3 and 4 is destined to be used for the treatment of tall growths, for example, of tree plantations. In this case the blower, which as in the previous embodiment forms with the supporting frame 2a unit which is mounted to swing on the pivot pins 3a, 4a of the frame 5 of the machine, has its outlet 1b connected by means of a flexible connection 7a to a mobile nozzle 20, which an extra attendant can point in any required blowing direction by means of a handle 21. A seat 15 provided on the supporting frame 2 for the extra attendant forms, together with the bearing 16a of the spindle 16 of a hand operated crank 17 and a connecting frame 16b, a unit which can be mounted as a whole on the supporting frame 2 or removed as a whole from the same. For the control of the swinging motion of the unit formed by the blower casing and the supporting frame the spindle 16 is provided with a driving chain sprocket 18, which is connected by means of a chain 23 with a chain wheel 19. This chain wheel 19 is rigidly fixed to the frame 5 of the machine coaxially to the axis of the blower, so that by turning the hand operated crank 17, the extra attendant can swing himself, together with the unit formed by the blower and the supporting frame, horizontally to the right or to the left round the vertical axis 1a of the blower. In Fig. 4 a position at 90° from the middle position is shown by dots and dashes. While one hand of the extra attendant is being used to control the swinging motion, he is able to bring the nozzle 20 to the required position with the other hand by means of the handle 21, the training motion being preferably effected in a vertical plane. In this manner and while remaining in his seat the extra attendant can easily modify the direction of the stream within wide limits, without thereby causing any major change in the aero-dynamic efficiency of the air duct. In addition the extra attendant can very easily supervise the culture in the course of treatment.

What I claim is:

1. A device for the destruction of parasites by the distribution of active substances in the shape of dust or of fine drops of liquid by means of a blower, comprising a machine frame, a supporting frame articulated to the machine frame, a blower casing, means for supplying a parasite destroying material to said blower casing, a distributor connected to said blower casing, said blower casing defining a vertical axis, and an axial bearing system arranged coaxially to the vertical axis of the blower and supporting the blower casing and the distributor on said supporting frame for swinging in a horizontal plane on the machine frame.

2. A device according to claim 1, wherein the distributor is fixed for the treatment of ground crops, comprising a hand operated crank, a chain drive operatively coupled to said crank, and a driven chain wheel coupled to said supporting frame and driven by the chain drive, the control of the swinging motion of the supporting frame being effected by said hand operated crank and said chain drive.

3. A device according to claim 2, comprising a supporting structure removably mounted on the supporting frame, said distributor having the shape of a distributing tube and being arranged transversely to the direction of motion of the machine during the treatment of the crops, said distributor being rigidly secured to said supporting structure for vertical adjustment.

4. A device according to claim 1, comprising a hand operated crank, a chain drive operatively coupled to said crank, a chain wheel driven by said chain and rigidly fixed to the machine frame, a driving sprocket, a bearing fixed to the supporting frame, the hand operated crank together with the driving sprocket being carried in said bearing, a seat fixed to the supporting frame adjacent the bearing for an attendant, and a nozzle flexibly connected to the blower casing.

5. A device according to claim 4, wherein the bearing for the hand operated crank together with the seat form a structural unit, the bearing together with the seat being mountable and demountable as a unit with regard to the supporting frame.

References Cited in the file of this patent

UNITED STATES PATENTS

| | | |
|---|---|---|
| 2,238,120 | Launder | Apr. 15, 1941 |
| 2,661,239 | Tirrell | Dec. 1, 1953 |
| 2,738,226 | Bals | Mar. 13, 1956 |